United States Patent
Örnerfors

(10) Patent No.: US 7,296,535 B2
(45) Date of Patent: Nov. 20, 2007

(54) METHOD OF MILKING AND MILKING PARLOR

(75) Inventor: Benny Örnerfors, Järfälla (SE)

(73) Assignee: Delaval Holding AB, Tumba (SE)

( * ) Notice: Subject to any disclaimer, the term of this patent is extended or adjusted under 35 U.S.C. 154(b) by 28 days.

(21) Appl. No.: 10/297,169

(22) PCT Filed: May 31, 2001

(86) PCT No.: PCT/SE01/01221

§ 371 (c)(1),
(2), (4) Date: May 12, 2003

(87) PCT Pub. No.: WO01/93666

PCT Pub. Date: Dec. 13, 2001

(65) Prior Publication Data

US 2003/0172876 A1    Sep. 18, 2003

(30) Foreign Application Priority Data

Jun. 7, 2000    (SE)    .................................... 0002134

(51) Int. Cl.
*A01J 5/00* (2006.01)
(52) U.S. Cl. .................................. 119/14.02
(58) Field of Classification Search ............. 119/14.02, 119/14.03, 14.18, 14.08
See application file for complete search history.

(56) References Cited

U.S. PATENT DOCUMENTS 5,959,526 A * 9/1999 Tucker .................... 340/572.1
6,062,164 A * 5/2000 Oosterling ............... 119/14.02
6,394,028 B1 * 5/2002 Birk ......................... 119/14.08
6,571,730 B1 * 6/2003 Norberg .................. 119/14.03
6,705,247 B1 * 3/2004 Heslin et al. ............. 119/14.02

FOREIGN PATENT DOCUMENTS

EP        0091892 A2    10/1983

(Continued)

OTHER PUBLICATIONS

Gerald R. Bodman et al., "Mastitis is a Disease—Control is a Everyday Task," Feb. 1996, http://ianrpubs.unl.edu/dairy/g1271.htm.

(Continued)

*Primary Examiner*—Son T. Nguyen
(74) *Attorney, Agent, or Firm*—Harness, Dickey & Pierce

(57) ABSTRACT

A method of automatically milking animals, such as cows, which are allowed to move freely in an area (1) intended therefore and to visit individually a milking parlor (9) comprising a fully automatic milking machine or milking robot (14) and an animal identification system (20), comprises the steps of dynamically assigning a milking qualification parameter to each of the animals that are allowed to move freely in said area, the respective milking qualification parameter indicating the degree of suitability that the respective animal, to which the milking qualification parameter is assigned, shall be milked; dynamically ranking the animals in accordance with their respective milking qualification parameters; and milking an animal during a visit to the milking parlor only if said animal is identified as belonging to the X highest ranked animals, i.e. the X animals that are best suited to be milked from a milk production optimization viewpoint, X being a positive integer.

14 Claims, 2 Drawing Sheets

FOREIGN PATENT DOCUMENTS

| | | |
|---|---|---|
| EP | 0332230 A2 | 9/1989 |
| EP | 0551957 A1 | 7/1993 |
| EP | 0639327 A1 | 8/1994 |
| EP | 0636313 A2 | 2/1995 |
| EP | 0800341 B1 | 10/1997 |
| EP | 0907314 B1 | 4/1999 |
| EP | 0988784 A1 | 3/2000 |
| WO | WO 95/35028 | 12/1995 |
| WO | 9619917 | 7/1996 |
| WO | 9826649 | 6/1998 |
| WO | WO 01/45496 A1 | 6/2001 |

OTHER PUBLICATIONS

Duane N. Rice et al., "The Somatic Cell Count and Milk Quality," May 1997, http://ianrpubs.unl.edu/dairy/g1151.htm.

Charles Stoltenow et al., "Proper Milking Techniques," *NDSU Extension Service*, Mar. 1997.

Clell V. Bagley et al., "Staph Mastitis: Herd Control Program," *Utah State University Extension*, Jul. 1997.

* cited by examiner

DATABASE

| RANK | COW NO. | QUAL. PAR. |
|------|---------|------------|
| 1    | 5       | 99         |
| 2    | 12      | 87         |
| 3    | 3       | 75         |
| 4    | 2       | 73         |
| 5    | 1       | 65         |
| 6    | 9       | 61         |
| 7    | 20      | 58         |
| 8    | 19      | 55         |
| 9    | 17      | 49         |
| 10   | 13      | 47         |

Fig. 2

METHOD OF MILKING AND MILKING PARLOR

TECHNICAL FIELD OF THE INVENTION

The present invention generally relates to dairy farming and to milking of dairy animals therein.

Particularly, the invention relates to a method of automatically milking animals and to a milking parlor adapted to perform said method.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time.

A major trend in this respect is an increased degree of automation of the various activities. For instance, machine milking may be performed by milking robots in a completely automated manner. Such an automatic milking system may take care of milking, feeding, milk inspection, milk sampling, animal traffic, etcetera in a large area wherein the dairy animals are walking about freely and are visiting the milking machine voluntarily.

A milking machine involves heavy expenditure and has a limited milk production capacity. Thus, animals having a high milk production should be allowed to be milked more often than animals having a low milk production. The operation and use of a milking machine, which animals are visiting on a voluntary basis, in order to obtain an overall dairy farm performance is an arduous task. An objective is here to safeguard an optimal milk production. Naturally, ethical aspects as well as animal care have to be considered.

EP 0988784 E1 (MAASLAND N. V.) discloses a method of automatically milking animals, which are allowed to visit individually a milking parlor comprising a milking robot and an animal identification system. An animal visiting the milking parlor is milked only if at least a specific number of milkings, Q, of other animals has taken place since the last milking of the relevant animal. The number Q is calculated as $Q=cM/x$, where x is an individual animal parameter indicating how often the relevant animal has to be milked (a high figure for an animal having a high milk production). M is the total number of milkings performed by the robot, and c is a correction factor (between 0.5 and 1), which corrects for the fact that an animal only visits the robot a limited number of times per time unit.

Alternatively, $Q=cmM/x^2$, where m is the number of recent milkings per unit time of the relevant animal. By this consideration also for how often the relevant animal has been milked recently is made, i.e. Q is corrected by the factor m/x which is higher than 1 if the animal has recently been milked more frequently than her desired value.

SUMMARY OF THE INVENTION

It is an object of the present invention to provide a method for automatically milking animals, such as cows, which are allowed to move freely in an area intended therefore and to visit individually a milking parlor comprising a automatic milking machine or milking robot, and an animal identification system, which is optimal in a milk production optimization viewpoint.

It is yet a further object to provide such an inventive method that is simple, reliable, of low cost, and easy to implement.

These objects among others are, according to one aspect of the invention, attained by a method as claimed in any of claims 1-7.

Further objects of the present invention are to provide a milking parlor and a computer program product for performing the inventive method.

Consequently, there is according to a second and a third aspect of the present invention provided a milking parlor and a computer program product, respectively as claimed in claims 8 and 9.

Further characteristics of the invention and advantages thereof will be evident from the following detailed description of embodiments of the invention.

In the following detailed description the milk producing animals are cows. However, the invention is not limited to cows, but is applicable to any animals having the capability to produce large quantities of milk, such as sheep, goats, buffaloes, horses, etc.

BRIEF DESCRIPTION OF THE DRAWINGS

The present invention will become more fully understood from the detailed description of embodiments of the present invention given hereinbelow and the accompanying FIG. 1, which is given by way of illustration only, and thus is not limitative of the present invention.

FIG. 2 displays schematically an example of an extract of a database comprised in a processing device of the animal arrangement of FIG. 1.

DETAILED DESCRIPTION OF EMBODIMENTS

Figure 1:
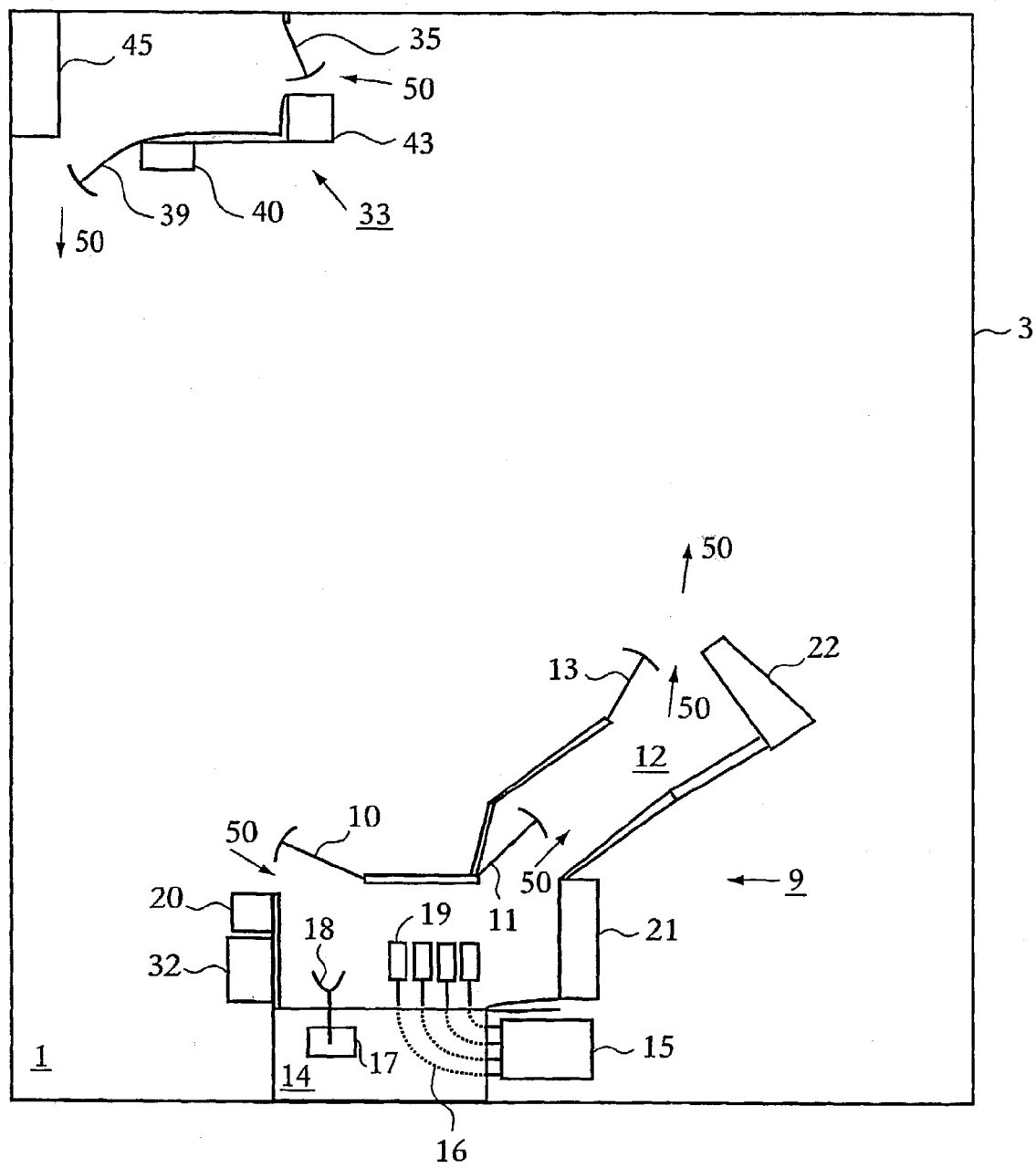
FIG. 1 displays schematically an embodiment of an animal arrangement for housing a herd of cows including an arrangement for automatically notifying a dairy farmer according to the present invention.

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

FIG. 1. discloses an animal arrangement for housing a herd of cows. The arrangement comprises an area 1 defined by enclosure means 3 in the shape of a fence, a grid or the like. Area 1 is arranged to house cows permitted to walk about freely.

In area 1, there is provided a milking station or parlor 9 arranged for voluntary milking of the freely walking cows, i.e. the cows enter the milking station 9 in order to be milked when they need to. The milking station 9 comprises an enclosure having an inlet gate 10 and an outlet gate 11. Outside the outlet gate 11 there may be an exit space 12 to be passed by the cow leaving the milking station. The exit space 12 comprises a further outlet gate 13.

The milking station 9 comprises an automatic milking machine 14 connected to a milk storage tank 15 by means of milk lines 16. Milking machine 14 includes an automatic handling device 17 having a robot arm 18 arranged to automatically apply teatcups 19 of the milking machine to the teats of a cow present in the milking station 9.

Furthermore, the milking station 9 comprises an identification member 20 provided to identify a cow approaching the milking station 9. All of the gates 10, 11 and 13 are controllable by means of a schematically disclosed gate control device 31.

Further, automatic handling device 17, and gate control device 31 are connected to a central processing and control device 32. The central processing and control device 32 is responsible for central processing and controlling of the animal arrangement, and comprises typically a microcomputer, suitable software, and a database of the cows in the area 1.

Thus a cow approaching the milking station may be given access to the milking station after having been identified by the identification member 20 by opening of the inlet gate 10.

During milking, milk is drawn from the teats of the cow by means of vacuum being applied to the teatcups 19. The milk drawn is measured by means of one or several milk meters (not illustrated), whereafter it is collected in milk storage tank 15. Preferably, there is provided a milk meter for each teat cup for measuring the individual milk flow from each teat. Further, each teat cup is preferably connected individually by means of respective milk line 16 to milk storage tank 15.

After the milking has been completed the cow may leave the milking station 9 by opening of the outlet gates 11 and 13. The milking station 9 may also comprise a first feeding device 21 provided in the front end of the milking station 9 and a second feeding device 22 provided in the front end of the exit space 12.

A purpose of the first feeding device 21 is to entice the cow to enter the milking station 9 and to make her stand still during at least the attachment of the teatcups and a purpose of the second feeding device 22 is to entice the cow to leave the milking station 9 after the milking has been finished or is interrupted for any reason.

It is to be noted that the cow may be enticed to enter and leave the milking station 9 by other enticing means than the feeding devices 21, 22 disclosed. In this connection reference is made to WO 96/19917.

Furthermore, area 1 houses a stall or feeding station 33 accessible to the cows, i.e. the cows enter the feeding station 33 in order to eat and drink when they need to. The feeding station 33 comprises an enclosure having an inlet gate 35 and an outlet gate 39.

The feeding station 33 houses an automatic feeding device 45 arranged to offer solid and liquid feed, such as concentrate, hay and water, to the cows. Furthermore, feeding station 33 comprises an identification member 43 provided to identify a cow approaching the feeding station 33. The gates 35 and 39 are controllable by means of a schematically disclosed gate control device 40. This gate control device 31 is preferably connected to the central processing and control device 32 located at the milking parlor 9 such that it is controllable therefrom.

Thus a cow approaching the feeding station may be given access to the milking station after having been identified by the identification member 43 by opening of the inlet gate 35. The cow then enters inlet gate 35 and is automatically fed by means of feed device 45. After the feeding has been completed the cow may leave the feeding station 9 by opening of the outlet gate 39.

In FIG. 1 arrows 50 indicate schematically the flows of cows through milking parlor 9 and feeding station 33, respectively.

Further, it shall be noted that the first area also may include more than one feeding supply station, separate solid and liquid supply stations as well as more than one single milking station 9.

According to the present invention a milking qualification parameter is assigned to each of the cows that are allowed to move about freely in said area, the respective milking qualification parameter indicating the degree of suitability from a milk production optimization viewpoint that the respective cow, to which the milking qualification parameter is assigned, shall be milked, after which the cows are ranked in accordance with their respective milking qualification parameters. It shall be readily appreciated that this milking qualification parameter ranking has nothing to do with the cows own internal order of precedence or hierarchy.

Further, each cow that visits milking station 9 is identified by means of respective cow identification system 20. A cow is only allowed to be milked if said cow is identified as belonging to the X highest ranked cows, i.e. the X cows that are best suited to be milked from a milk production optimization viewpoint, X being a first positive integer.

By "best suited to be milked" is meant best suited to be milked in order to optimize the dairy farm performance. An objective in this respect may be to obtain an optimal milk quality and quantity, while keeping the cow "happy", i.e. healthy and satisfied.

By denying cows having a low rank, capacity of the milking station is set free to be utilized for milking highly ranked cows, which results in a better machine utilization.

Denied cows are preferably allowed to pass through the milking station without being milked. In alternative embodiments, denied cows may pass by the milking station without entering it.

The inventive concept is preferably implemented by means of a computer program product loadable into a memory of the processing and control device 32, the program product comprising software code portions for performing the inventive steps when said product is run on the processing and control device 32.

By such method an optimal milk production is obtainable, wherein the milking station is most optimally operated and used.

The database held in processing and control device 32 of milking parlor 33 is, for the present purpose, provided with two further fields for each cow. FIG. 2 displays schematically an example of an extract of such a database. The database comprises here three fields for each cow. One field (the middle one) stores a cow identification number for identification of the respective cow; in the example of FIG. 2 cows Nos. 5, 12, 3, 2, etc. are listed from above. A field on the left-hand side specifies the ranking of the cow; in the illustrated example the records are sorted with the first ranked cow, i.e. the cow that any given time is best suited to be milked, (cow No. 5) on top. Finally, the right-hand field specifies the milking qualification parameter value; in the illustrated example cow No. 5 has the value 99, cow No. 12 has the value 87, etc. In the example X is selected to be 10, which implies that only cows having Nos. 5, 12, 3, 2, 1, 9, 20, 19, 17, and 13, respectively are allowed to be milked.

It shall be appreciated that the respective milking qualification parameters are updated repeatedly, and that the cows are re-ranked subsequent to each updating. In such manner a dynamic time-dependent optimization of the milking station operation is obtained.

A crucial point, however, is how to determine the respective milking qualification parameters and how and when to update them.

One factor to consider is the time elapsed since the respective cow, to which the respective milking qualification parameter is assigned, was milked last. A short time since last milking yields a low parameter value, whereas a long time since last milking yields a high parameter value. In such manner the respective parameter value increases with the time elapsed since the last milking of the respective cow.

The parameter values are updated automatically once a minute, or once every tenth minutes or with other time intervals between the updates. The may also be updated manually by the dairy farmer. Alternatively, they are updated when any cow presents herself at the milking machine.

Also, different cows have different milk production and need thus to be milked with different frequencies. Thus, the milking qualification parameter value for a cow having a high milk production, i.e. a high milk secretion per unit time, should increase faster than the milking qualification parameter value for a cow having a low milk production. The parameter values may also be adjusted in order to prevent too frequent or too infrequent milkings of a cow, as this otherwise may affect the health of the cow adversely.

Another factor to consider is where in the lactation period the respective cow is, or if the cow is dry.

Yet another factor to consider is the health, particularly the udder health, of the respective cow, to which the respective milking qualification parameter is assigned. A healthier cow is considered to better contribute to the milk production than a sick cow and should therefore be assigned a higher parameter value, all other factors being held equal. An exception of this is e.g. a cow having mastitis as milking of such a cow is part of its treatment. In such instance, the milking qualification parameter is rather to be increased.

The factors that may be measured include cell count, temperature, milk temperature, milk conductivity or other. Further, the teats may be inspected to find wounds or injures, or to check whether the are burned due to e.g. strong sunlight.

Still another factor to consider is the udder filling level of the respective cow. The udder filling level may be measured in a plurality of ways, and this level may affect the cow's parameter value. A higher level than expected would result in an increase of the parameter value and a lower level than expected would result in a decrease of the parameter value.

Yet another factor to consider is whether the respective cow, to which the milking qualification parameter is assigned, is giving suck to a suckling cow or not. If the answer is affirmative, this would have an impact to lower the relevant cow's parameter value.

Still another factor to consider is the pattern of behavior of the respective cow, to which the milking qualification parameter is assigned. The activity of the cows, for instance, can be measured by means of a respective activity meter. In order to keep the cows healthy, they have to be able to walk, lie, sleep, ruminate etc. between the milkings.

Yet another factor to consider is the feed consumption of the respective cow, to which the milking qualification parameter is assigned.

Other factors to consider are the age, the lactation stage, number of calves, the feed assignment, and earlier, present and upcoming treatments (e.g. of mastitis) of the respective cow.

In the general case the respective milking qualification parameters $Q_n$ are each a function of number of these factors, i.e.

$$Q_n = \sum_i c_i F_i(t)$$

where c is a constant, F(t) is a time dependent factor, and i is the number of factors to consider.

It shall be appreciated that the respective milking factors normally are automatically repeatedly updated by means of a suitable algorithm. Nevertheless, the respective parameter values may be updated manually, or at least the algorithm may be modified manually by a user.

Further, the present invention may comprise actively enticing a cow at a remote location, e.g. at feeding station 33, of the milking parlor 9, the remote location housing a cow identification system 43, to visit said milking parlor only if the cow is identified as belonging to the Y highest ranked cows, i.e. the Y cows that are best suited to be milked from a milk production optimization viewpoint, Y being a second positive integer and smaller than, or equal to, X.

The enticing may be performed by any enticing means (not illustrated in FIG. 1) known in the art. A simple form of enticing is just to not open entry gate 35 of feeding station 33 if a cow, presenting herself at the feeding station 33, is identified as belonging to the Y highest ranked cows. In such manner the cow is enticed to find food elsewhere, such as at the milking station 9.

The present invention thus provides for a method of optimizing the overall performance of a dairy farm, which is provided with a given amount of equipment, i.e. number of milking machines, for a given size of herd of cows. Hence, the invention provides for an optimal use of a limited resource.

A particular feature of the invention is that the rank list may be altered between two times despite the fact that not a single cow has been milked during the intermediate time. Thus, a cow being ranked among the X cows at a time may at a later time not be ranked among the X cows despite not being milked in between.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method of automatically milking a group of animals, which are allowed to move freely in an area intended therefore and to visit individually a milking parlor comprising an automatic milking machine or milking robot and an animal identification system, the method comprising:
   assigning a milking qualification parameter to each of the animals that are allowed to move freely in said area, the respective milking qualification parameter being a numerical value and indicating the degree of suitability that the respective animal, to which the milking qualification parameter is assigned, shall be milked;
   ranking the animals in a consecutive order in accordance with their respective milking qualification parameters; and
   milking an animal during a visit to the milking parlor only if said animal is identified as belonging to the X highest ranked ones of the ranked animals, X being a constant number over time, wherein
   the assigned milking qualification parameters are updated repeatedly; and
   the animals are re-ranked subsequent to each updating.

2. The method as claimed in claim 1, wherein said X highest ranked ones of said ranked animals are the X animals of said animals that are best suited to be milked from a milk production optimization viewpoint.

3. The method as claimed in claim 1, wherein said milking animals are cows.

4. The method as claimed in claim 1 comprising enticing an animal at a remote location of said milking parlor, said remote location housing an animal identification system, to visit said milking parlor only if said animal is identified as belonging to the Y highest ranked ones of said ranked animals, Y being a second positive integer and smaller than or equal to X.

5. The method as claimed in claim 4, wherein said Y highest ranked ones of said ranked animals are the Y animals of said animals that are best suited to be milked from a milk production optimization viewpoint.

6. A milking parlor comprising an automatic milking machine or milking robot and an animal identification system, wherein said milking parlor is adapted to perform the method as claimed in claim 4.

7. The method as claimed in claim 1 comprising the steps of updating the assigned milking qualification parameters dependent on an animal visiting the milking parlor; and re-ranking the animals subsequent to each updating.

8. The method as claimed in claim 1, wherein the respective milking qualification parameter is determined dependent on the time elapsed since the respective animal, to which the milking qualification parameter is assigned, was milked last; dependent on the lactation period of the respective animal, to which the milking qualification parameter is assigned; dependent on the milk yield per unit time of the respective animal, to which the milking qualification parameter is assigned; dependent on the health of the respective animal, to which the milking qualification parameter is assigned; dependent on the udder health of the respective animal, to which the milking qualification parameter is assigned; dependent on the udder filling level of the respective animal, to which the milking qualification parameter is assigned; dependent on whether the respective animal, to which the milking qualification parameter is assigned, is giving suck to a sucking animal; dependent on the pattern of behavior of the respective animal, to which the milking qualification parameter is assigned; dependent on the activity of the respective animal, to which the milking qualification parameter is assigned; or dependent on the feed consumption of the respective animal, to which the milking qualification parameter is assigned.

9. The method as claimed in claim 1, wherein the first positive integer X is determined dependent on the respective milking qualification factors.

10. The method as claimed in claim 1, wherein the first positive integer X is determined dependent on the number of milkings performed by the automatic milking machine during a particular period of time.

11. The method as claimed in claim 1, wherein the first positive integer X is updated in connection with the step of updating the milking qualification factors.

12. A computer program product loadable into the internal memory of a computer, comprising software code portions for performing the steps of claim 1 when said product is run on said computer.

13. A method of automatically milking animals, the method comprising:
   assigning respective milking qualification parameters to animals in an area;
   ranking the animals in a consecutive order in accordance with their respective milking qualification parameters; and
   milking an animal using a milking parlor only if said animal is identified as belonging to the X highest ranked ones of the ranked animals, X being a constant number over time.

14. A method comprising:
   assigning respective milking qualification parameters to animals in an area;
   ranking all of the animals in consecutive order from a highest ranked animal having a highest milking qualification parameter to a lowest ranked animal having a lowest milking qualification parameters; and
   milking an animal using a milking parlor only if said animal is identified as belonging to the X highest ranked ones of the ranked animals, X being a positive integer.

* * * * *